United States Patent
Shinada et al.

[19]

[11] Patent Number: 5,809,168
[45] Date of Patent: Sep. 15, 1998

[54] METHOD AND APPARATUS FOR ESTIMATING A CHARACTER SIZE OF AN ALPHANUMERIC SUBJECT COPY IN A FACIMILE SYSTEM

[75] Inventors: Tomohiro Shinada, Tokyo; Akihiro Hasegawa, Shizuoka, both of Japan

[73] Assignee: NEC Corporation, Tokyo, Japan

[21] Appl. No.: 363,858

[22] Filed: Dec. 27, 1994

[30] Foreign Application Priority Data

Dec. 24, 1993 [JP] Japan ................................. 5-327123

[51] Int. Cl.[6] .......................................... G06K 9/00
[52] U.S. Cl. .................................... 382/193; 382/245
[58] Field of Search ................................... 382/244, 203, 382/245, 246, 187, 190, 200, 192, 171, 177, 194, 193, 170, 168, 172, 173, 178, 179, 180, 181, 201, 195, 199, 209, 217, 224, 270, 271, 272, 273, 323, 289, 196, 228, 226, 313; 341/51, 67, 79

[56] References Cited

U.S. PATENT DOCUMENTS 3,845,466  10/1974  Hong .................................. 340/146.35
4,104,616   8/1978  Isshiki et al. ........................... 382/193
4,136,363   1/1979  Saran ...................................... 358/261
4,516,173   5/1985  Abe et al. .............................. 358/261
5,099,435   3/1992  Collins et al. ......................... 395/150
5,111,514   5/1992  Ohta ....................................... 382/173
5,153,591  10/1992  Clark ......................................... 341/51
5,513,277   4/1996  Huttenlocher .......................... 382/171

OTHER PUBLICATIONS

Telegraph and Telematic Services Terminal Equipment, VIIth Plenary Assembly, Geneva, Nov. 11–21, 1980, Yellow Book, vol. VII, Fascicle VII.2 —Rec. T.4, pp. 222–227. International Telecommunication Union, CCITT–(No Author).

Primary Examiner—Leo Boudreau
Assistant Examiner—Bijan Tadayon
Attorney, Agent, or Firm—Sughrue, Mion, Zinn, Macpeak & Seas, PLLC

[57] ABSTRACT

In order to estimate a character size of a subject copy in a facsimile system, the number of white runs is detected with respect to each of run length detected. Subsequently, an average white run length is determined. Thereafter, the character size is estimated by referring to data indicating a relationship between an average white run length and a character size.

5 Claims, 4 Drawing Sheets

(The scan process is repeated row by row, top to bottom, until the subject copy is completely reported)

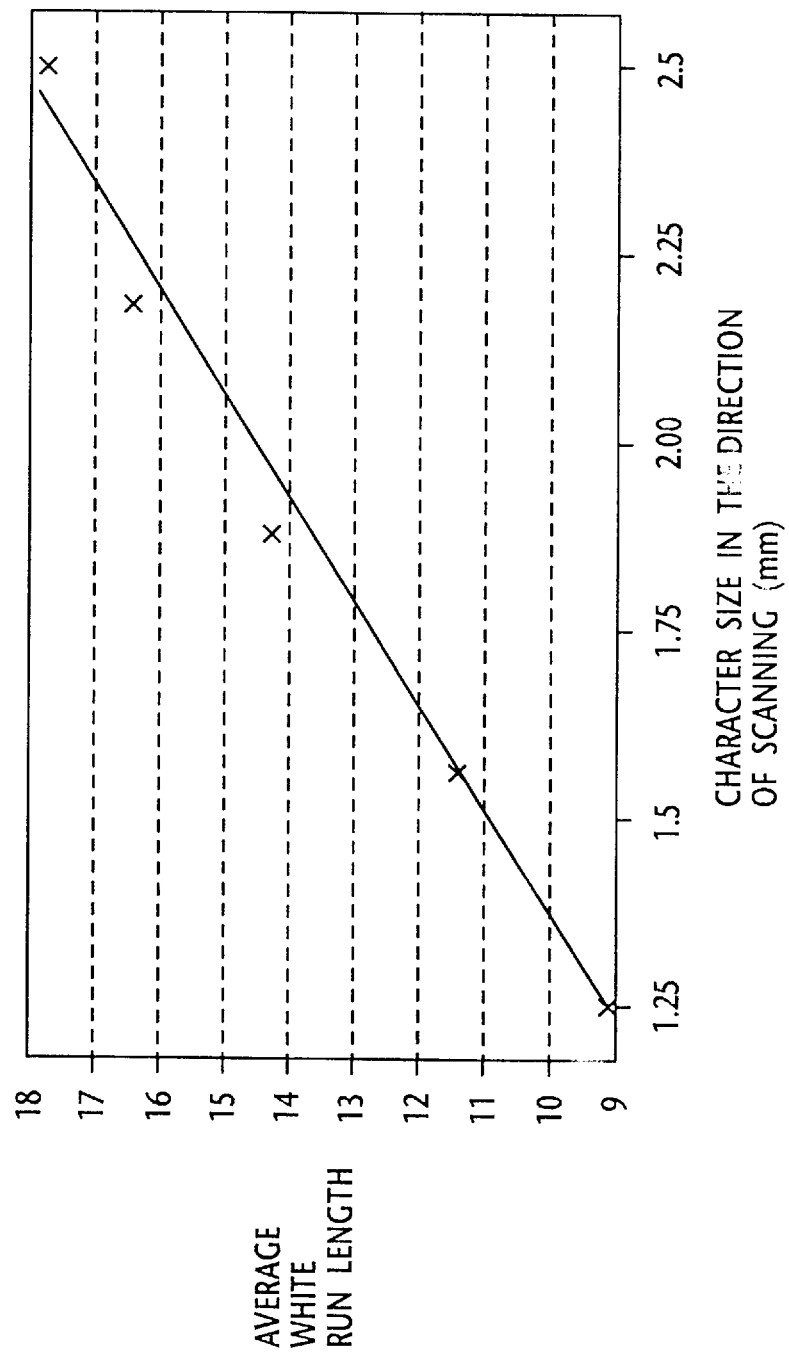

METHOD AND APPARATUS FOR ESTIMATING A CHARACTER SIZE OF AN ALPHANUMERIC SUBJECT COPY IN A FACIMILE SYSTEM

TITLE OF THE INVENTION

Method and apparatus for estimating a character of an alphanumeric subject copy in a facsimile system.

BACKGROUND OF THE INVENTION

1. Field of the Invention

The present invention relates generally to improvements in a facsimile system, and more specifically, to a method and apparatus for estimating a character size of a subject copy to be transmitted. Still further, the present invention is applicable to estimation of a character size of the image of a subject copy received. The present invention may also be applied to techniques for controlling facsimile operations based on the estimated character size when transmitting and receiving the image of a subject copy.

2. Description of the Related Art

In a facsimile system, many efforts have been made to effectively process the image of a subject copy. One example is to distinguish a graphic portion(s) of the document image in order to clearly reproduce the portion.

However, no proposal has been made in the art to estimate a character size based on the image of a subject copy.

SUMMARY OF THE INVENTION

It is an object of the present invention to provide a method for estimating a character size of the image of a subject copy received or to be transmitted.

Another object of the present invention is to provide a method for controlling facsimile operations based on the estimated character size.

Still another object of the present invention is to provide an apparatus for estimating a character size of the image of a subject copy image received or to be transmitted.

Still another object of the present invention is to provide an apparatus for controlling facsimile operations based on the estimated character size.

In brief, the above objects are achieved by techniques wherein in order to estimate a character size of a subject copy in a facsimile transmission, the number of white runs is detected with respect to each run length detected. Subsequently, an average white run length is determined. Thereafter, the character size is estimated by referring to data indicating a relationship between an average white run length and a character size.

BRIEF DESCRIPTION OF THE DRAWINGS

The features and advantages of the present invention will become more clearly appreciated from the following description taken in conjunction with the accompanying drawings in which like elements are denoted by like reference numerals and in which:

FIG. 4 is a graph showing a relationship between an average white run length of a subject copy and a character size thereof

DETAILED DESCRIPTION OF THE PREFERRED EMBODIMENTS

A facsimile machine to which the present invention is applicable is a type using a one-dimensional run length coding scheme. Before turning to the present invention, it is advantageous to briefly discuss conventional one-dimensional run length coding which is used for carrying out the present invention. As is well known in the art, a line of data is composed of a series of variable length code words. Each code word represents a run length of either all white or all black. White runs and black runs alternate. A total of 1728 picture elements represent one horizontal scan line of 215 mm length.

Black or which run lengths, up to a maximum length of one scan line (1728 picture pels) are defined by the code words which are of two types: terminating code words and make-up code words. By the way of example, these two types of code words are listed on pages 224–225 of CCITT, yellow book, Volume VII - Facsimile VII.2, Telegraph and Telematic Services Terminal Equipment, Recommendations of the S and T series, VII-th Plenary Assembly, Geneva, 10–21 Nov. 1980.

Each run length is represented by either one terminating code word or one make-up code word followed by a terminating code word. Run lengths in the range of 0 to 63 pels are encoded with their appropriate terminating code word. It is to be noted that there is a different list of code words for black and white run lengths. Run lengths in the range of 64 to 1728 pels are encoded first by the make-up code word representing the run length which is equal to or shorter than that required. This is then followed by the terminating code word representing the difference between the required run length and the run length represented by the make-up code.

Figure 1:
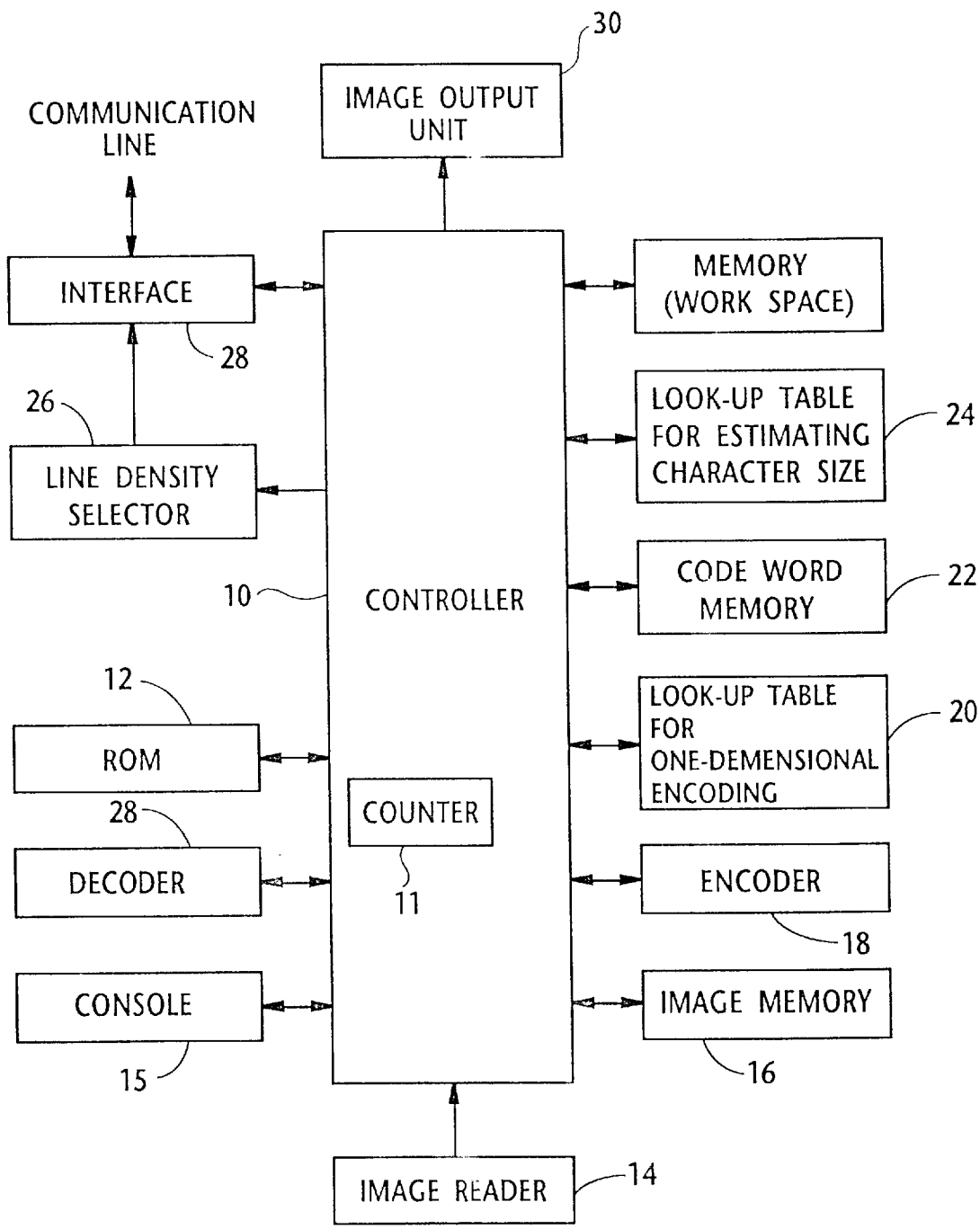
FIG. 1 is a block diagram schematically showing a facsimile arrangement embodying the present invention.
Figure 2:
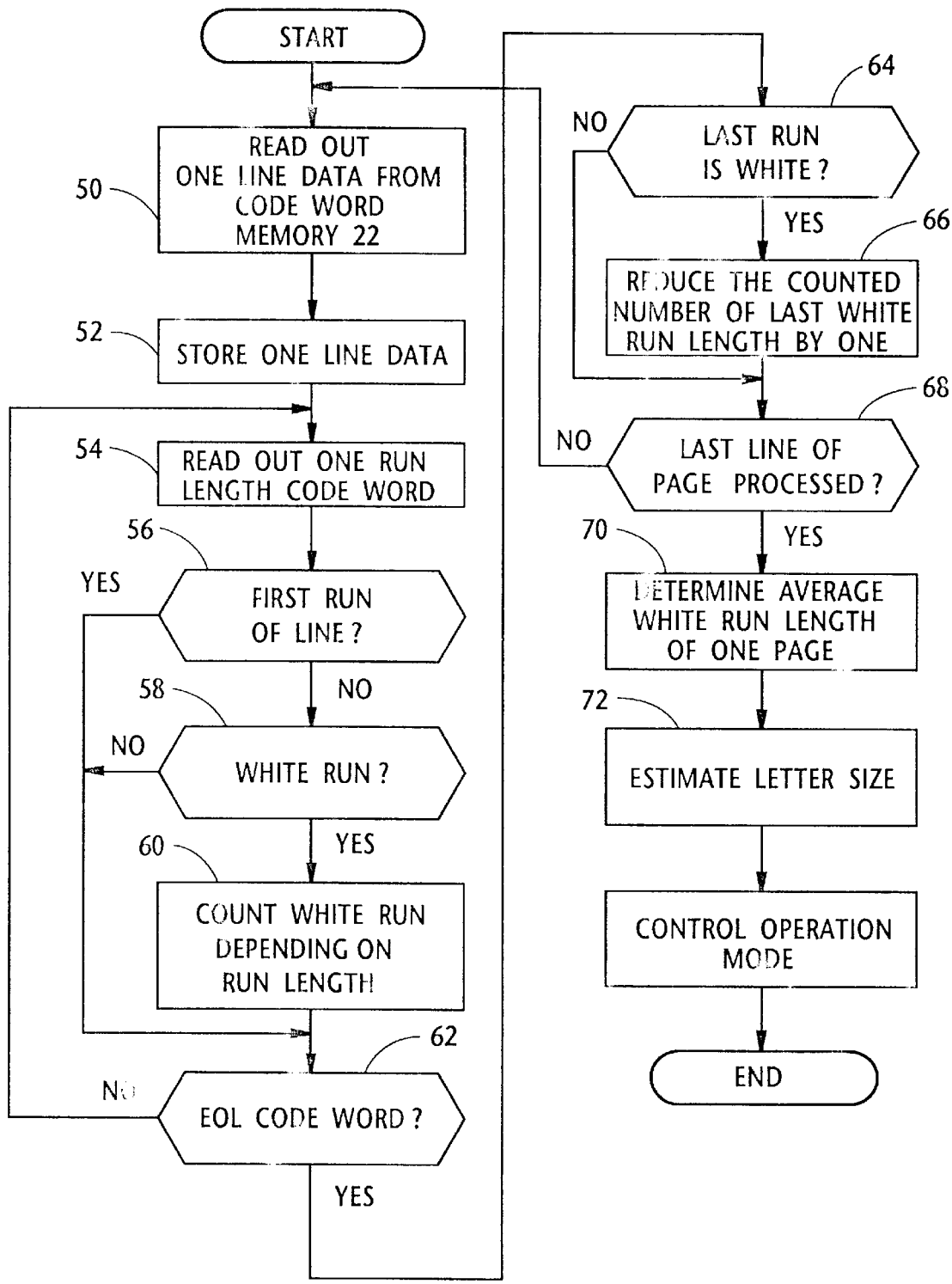
FIG. 2 is a flow chart which depicts steps which characterize the present invention.

FIG. 1 is a block diagram schematically showing one embodiment of the present invention.

Figure 3:
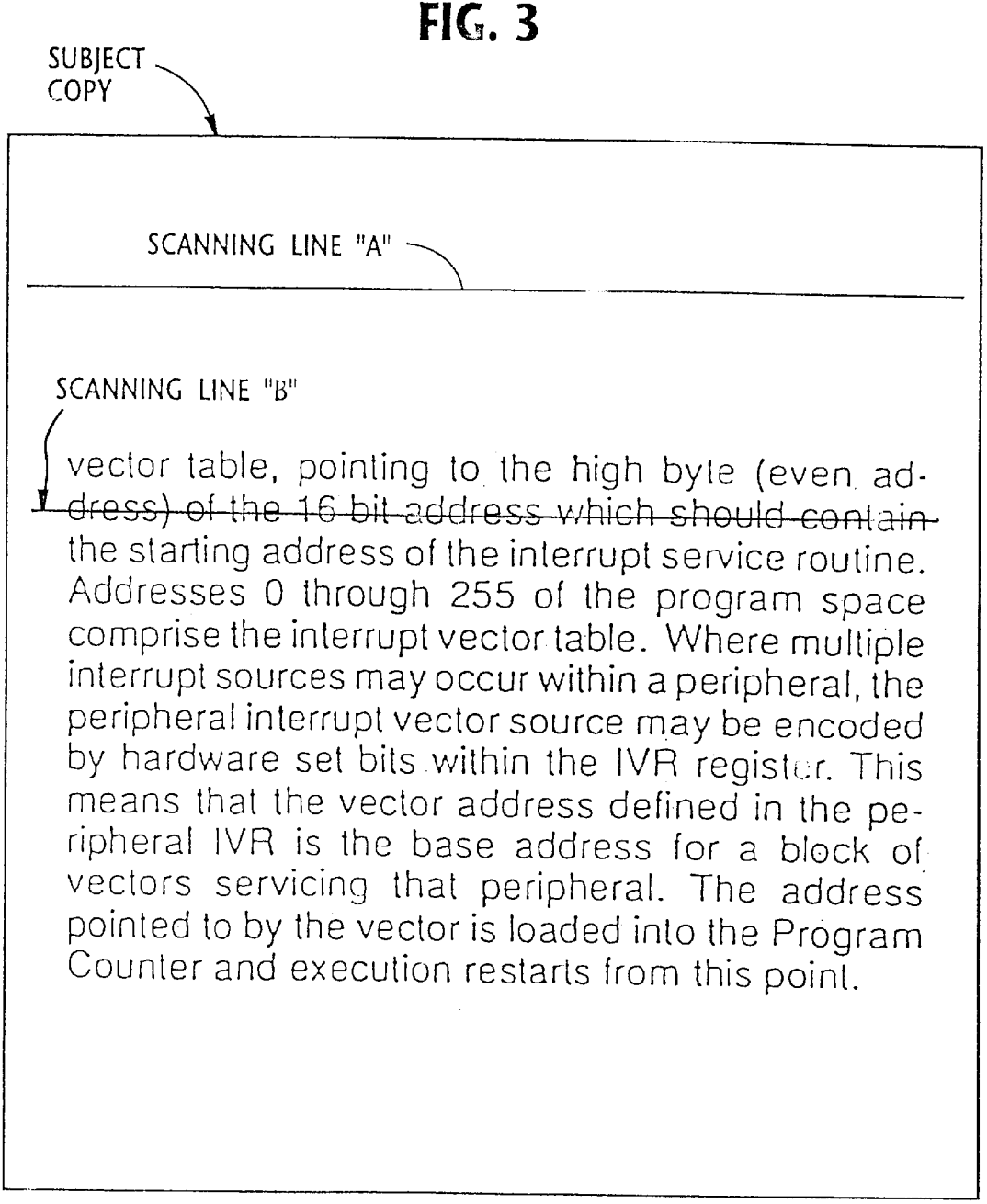
FIG. 3 is a subject copy which was used during the experiment, conducted by the inventors, for estimation of a character size of the subject copy.

Merely for a better understanding of the present invention, the image of a subject copy (viz., alphanumeric subject copy), such as shown in FIG. 3, is handled in the arrangement of FIG. 1 for estimating a character size of the copy. A controller 10 is provided for controlling the overall operations of the arrangement of FIG. 1 using a program prestored in a read only memory (ROM) 12. An image reader 14, in response to a control signal input via a console 15, initiates scanning of the subject copy in a manner well known in the art and sequentially outputs two-level signals with every horizontal (viz., main) scanning. The digital image of the entire subject copy is stored in an image memory 16. Upon the entire subject copy having been scanned, the controller 10 activates an encoder 18 to run length encode the image of the subject copy by referring to a look-up table (depicted by numeral 20) wherein the above mentioned make-up and terminating code words are listed. The code words thus generated are stored in a code word memory 22 in the form of a plurality of line data. The operations described thus far are well known in the art and thus, further description is deemed unnecessary.

Estimating a character size of the subject copy is discussed with reference to FIGS. 1–4.

As is known, an end-of-line (EOL) code word follows each line of data (referred to as "line data" interchangeably). This code (000000000001) is a unique code word that can never be found within a valid line of data. If a white area is scanned, a line data is comprised of one white run length code plus EOL code word.

In order to facilitate an understanding of the present invention, a line data obtained by scanning a white area is first discussed. One example of such scanning is denoted by a scanning line "A" illustrated in FIG. 3. In this case, only one run exists which is a white run. In other words, the first run of the line is also the last run of the line.

One line data is read out from the code word memory 22 at step 50 (FIG. 2) and then stored in a suitable buffer (not shown) at step 52. Following this, a first run length code word of the line data is derived from the buffer at step 54, after which a check is made to determine if the run length code word is the first run of the line (step 56). Since the run length code word in question corresponds to the first run, the answer is affirmative at step 56. Thus, the routine goes to step 62 where a check is made to determine if the run length code word is EOL (end-of-line) code word. In this case, the answer is negative at step 62, the routine returns to step 54. At this time, EOL code word is derived at step 54. The EOL code word thus derived is not a run length code word and accordingly, the routine goes to step 62 by way of steps 56 and 58. At step 62, the answer is affirmative (viz., the code word is EOL code word). Therefore, the routine goes to step 64 where a check is made to determine if the code word (viz., EOL) is the last run. The EOL code word is not a run length code word and thus, the routine goes to step 68. If the last line data has not yet been processed, the routine goes back to step 50 where the next line data is retrieved from the code word memory 22. If the next line data also represents an entirely white line, the above mentioned operations are repeated.

In the following, the processing of line data, which has been obtained by scanning a portion which includes characters, is discussed. One example of such scanning is denoted by a scanning line "B" illustrated in FIG. 3.

As in the above discussion, one code word (viz., the first code word of the line data) is read out at step 54. In this case, the routine goes to step 62 by way of step 56. Following this, the routine goes back to step 54 where the second code word is retrieved. It is understood that the routine proceeds to step 58 via step 56 in the instant case. If the second code word is a black run, the routine returns, via step 62, to step 54 where the third code word is obtained from the buffer at step 54. Since the second run has been black, the third run is white. Therefore, the routine proceeds to step 60. It is assumed that the third run length code word depicts a white run with a run length of 2 (by way of example). In this case, the controller 10 counts, using a counter 11, that the white run length of 2 occurs once. Thereafter, the routing loops steps 54, 56, 58, 60 and 62 until the EOL code word is detected. When the EOL code word is ascertained at step 62, the routine goes to step 64 where a check is made to determine the last run is white. Usually, the last run is white and thus, the routine goes to step 66 where the counted number of the last white run length is reduced. This is because the last white run is objectionable in estimating a character size of the subject copy.

When the last line of the subject copy has been processed (step 68), the routine goes to step 70 where an average white run length of the subject copy is determined. It is assumed that the controller 10 counted the number of occurrences of white run lengths as follows:

| White run length of 1: | 45 |
| White run length of 2: | 250 |
| White run length of 3: | 320 |
| ... | ... |
| White run length of 67: | 5 |

Then, the average white run length is calculated by dividing {(1×45)+(2×250)+(3×320)+. . . +(67×5)} by (45 +250 +320 +. . . +5), Before discussing the estimation of a character size of the subject copy at step 72, the experiments conducted by the inventors are described.

Various samples of the subject copy of FIG. 3 were prepared by enlarging and reducing the subject copy. Thereafter, the average white run length of each sample copy was measured using the above mentioned processes as shown in FIG. 4. The inventors concluded that character sizes in the direction of scanning (viz., horizontal character size) are substantially proportional to the average white run lengths. It is understood that the vertical character size (viz., the size in the direction normal to the direction of scanning) can usually be estimated by the horizontal character size in the direction of scan.

A look-up table 24 (Fig. 1) includes the relationship shown in FIG. 4.

Returning to FIG. 2, at step 72 a character size of the subject copy is estimated or determined by referring to the look-up table 24 under control of the controller 10.

After a character size of the subject copy is estimated, it is possible to suitably control facsimile operation modes. For example, if a character size is estimated large, a line density for transmitting the subject copy can be lowered to an extent that each character of the subject copy is legible. More specifically, the controller 10 controls a line density selector 26 which, in turn, adjusts an interface 28 such as to coarse the transmission line density. This implies that the transmission time can be saved.

In addition to the above, let us consider the case where the image of a subject copy is received at the facsimile shown in FIG. 1. In this case, if a character size of the transmitted document is estimated, a line density for outputting the received image can be controlled upon outputting the image using an image output unit 30. The image of a subject copy is decoded using a decoder 28 in a conventional manner.

It will be understood that the above disclosure is representative of only one possible embodiment of the present invention and that the concept on which the invention is based is not specifically limited thereto.

What is claimed is:

1. A method of estimating a character size on a subject copy in a facsimile system, comprising the steps of
   detecting white run lengths in a run length encoded signal,
   counting the number of white runs with respect to each white run length detected;
   determining an average white run length of said subject copy; and
   estimating said character size by referring to data indicating a relationship between average white run lengths and character sizes.

2. A method of estimating a character size on a subject copy in a facsimile system, comprising the steps of:
   scanning said subject copy to obtain an optical image thereof;
   storing said optical image in an image memory;
   run length encoding said optical image stored in said image memory;

obtaining a plurality of run length encoded line data of said subject copy;

counting the number of white runs with respect to each white run length based on said plurality of run length encoded line data;

determining an average white run length of said subject copy; and estimating a character size on said subject copy by referring to data indicative of a relationship between average white run lengths and character sizes, said data having been prepared and stored in a memory.

3. A method of estimating a character size on a subject copy in a facsimile system, comprising the steps of:

receiving a plurality of run length encoded line data of a subject copy transmitted over a communication line;

storing said plurality of run length encoded line data in an image memory;

counting the number of white runs with respect to each run length based on said run length encoded line data stored in said image memory;

determining an average white run length of said subject copy; and estimating a character size on said subject copy by referring to data indicative of a relationship between average white run lengths and character sizes, said data having been prepared and stored in a memory.

4. An apparatus for estimating a character size on a subject copy in a facsimile system, comprising:

a scanner for scanning said subject copy to obtain an optical image thereof;

an image memory for storing said optical image output by said scanner;

an encoder for run length encoding said optical image stored in said image memory, said encoder generating run length encoded line data of said subject copy;

a counter for counting the number of white runs with respect to each run length based on said run length encoded line data;

means for determining an average white run length of said subject copy; and means for estimating a character size by referring to data indicative of a relationship between average white run lengths and character sizes, said data having been prepared and stored in a memory.

5. An apparatus for estimating a character size of a subject copy in a facsimile system, comprising:

a receiver section for receiving run length encoded line data of a subject copy transmitted over a communication line;

an image memory for storing said run length encoded line data of said subject copy;

means for counting the number of white runs with respect to each run length based on said run length encoded line data;

means for determining an average white run length of said subject copy; and means for estimating said character size by referring to data indicative of a relationship between average white run lengths and character sizes, said data having been prepared and stored in a memory.

* * * * *